No. 617,374.    Patented Jan. 10, 1899.
C. K. TVEIT.
DRAFT EQUALIZER.
(Application filed Apr. 1, 1896.)
(No Model.)

Witnesses:
J. W. Fowler Jr.
Herbert D. Lawson.

Inventor
Charles K. Tveit.
by J. Wm. Hister
Attorney

UNITED STATES PATENT OFFICE.

CHARLES KITIL TVEIT, OF MOORHEAD, MINNESOTA.

DRAFT-EQUALIZER.

SPECIFICATION forming part of Letters Patent No. 617,374, dated January 10, 1899.

Application filed April 1, 1896. Serial No. 585,787. (No model.)

*To all whom it may concern:*

Be it known that I, CHARLES KITIL TVEIT, a citizen of the United States, residing at Moorhead, in the county of Clay and State of Minnesota, have invented certain new and useful Improvements in Draft-Equalizers; and I do hereby declare the following to be a full, clear, and exact description of the invention, such as will enable others skilled in the art to which it appertains to make and use the same.

My invention relates to improvements in draft-equalizers; and it has for its object to offset or equalize by the draft of a single horse or animal that of two or more horses or animals; and it consists of the combination of various parts and their arrangement, substantially as hereinafter more fully disclosed, and specifically pointed out in the claim.

Figure 1:
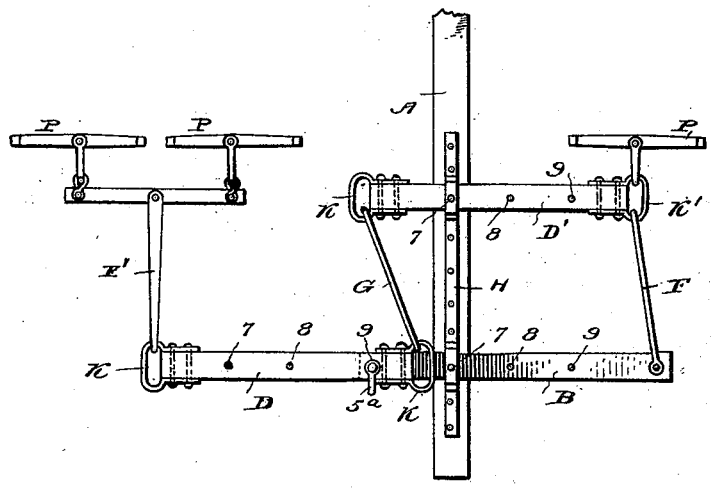
Figure 2:
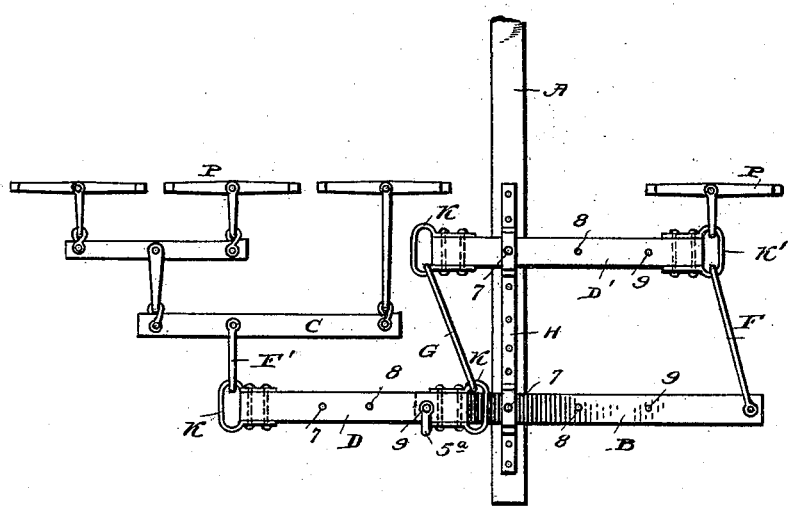

In the accompanying drawings, Figure 1 is a plan view of my improved draft-equalizer. Fig. 2 is a like view of the same, showing it adapted for four horses.

In carrying out my invention I employ a series of three adjustable bars or levers B D D', having adjusting-holes 7 8 9, the levers or bars B D ranging in parallel planes one above the other and the lever or bar B being pivoted or connected to the draft pole or tongue A under a loop in the hammer-strap H, while the bar or lever D is connected to the bar B by a clip 5ª. The bar or lever D' is also pivoted or connected to the draft pole or tongue A under a second loop of the hammer-strap H and to the diagonally opposite bar or lever D by an oppositely diagonally disposed link G, connecting with loops K, secured to opposite ends of said bars or levers D D', respectively. The bar or lever D' has its end opposite to that to which is connected the link G connected to the end of the bar or lever B opposite to that which is connected the bar D by a clevis-like link F to said end of bar or lever B and interlooped with a loop K', secured to the corresponding end of the lever or bar D', also adapted to provide for the connecting therewith of a whiffletree P. By this arrangement it will be seen that with the lever or bar B pivoted at the aperture next to that nearest its inner end and its said end coupled or connected by the clip 5ª to the lever D at its innermost aperture, as in Fig. 1, one horse at P on one side of the draft-pole is enabled to offset or equalize two horses at the opposite side of said draft pole or tongue at P P, and that with a like adjustment of said parts and the interposed lever C one horse or animal will offset three horses at the opposite side of the draft pole or tongue, as seen in Fig. 2, and that this adjustment of parts can be accommodated at opposite sides of the draft-pole.

I claim and desire to secure by Letters Patent—

In a draft-equalizer, the combination of the serially-apertured adjustable levers or bars, arranged in parallel planes, one above the other, one lever adapted to be pivoted to the draft bar or pole, the clip or coupling adapted to engage coincident apertures of said levers or bars, a third adjustable lever pivoted to the draft-bar and having end loops, a link or rod connecting diagonally the inner ends of one of the first-referred-to adjustable levers or bars and the last-named adjustable lever, the doubletree connected to one end of said first-referred-to adjustable levers and, itself, carrying singletrees, the clevis-like link connecting opposite ends of one of the first-referred-to levers and said last-named adjustable lever, and a singletree carried by said last-referred-to adjustable lever, substantially as specified.

In testimony whereof I affix my signature in presence of two witnesses.

CHARLES KITIL TVEIT.

Witnesses:
JOHN COSTAIN,
JOHN BRODINE.